UNITED STATES PATENT OFFICE.

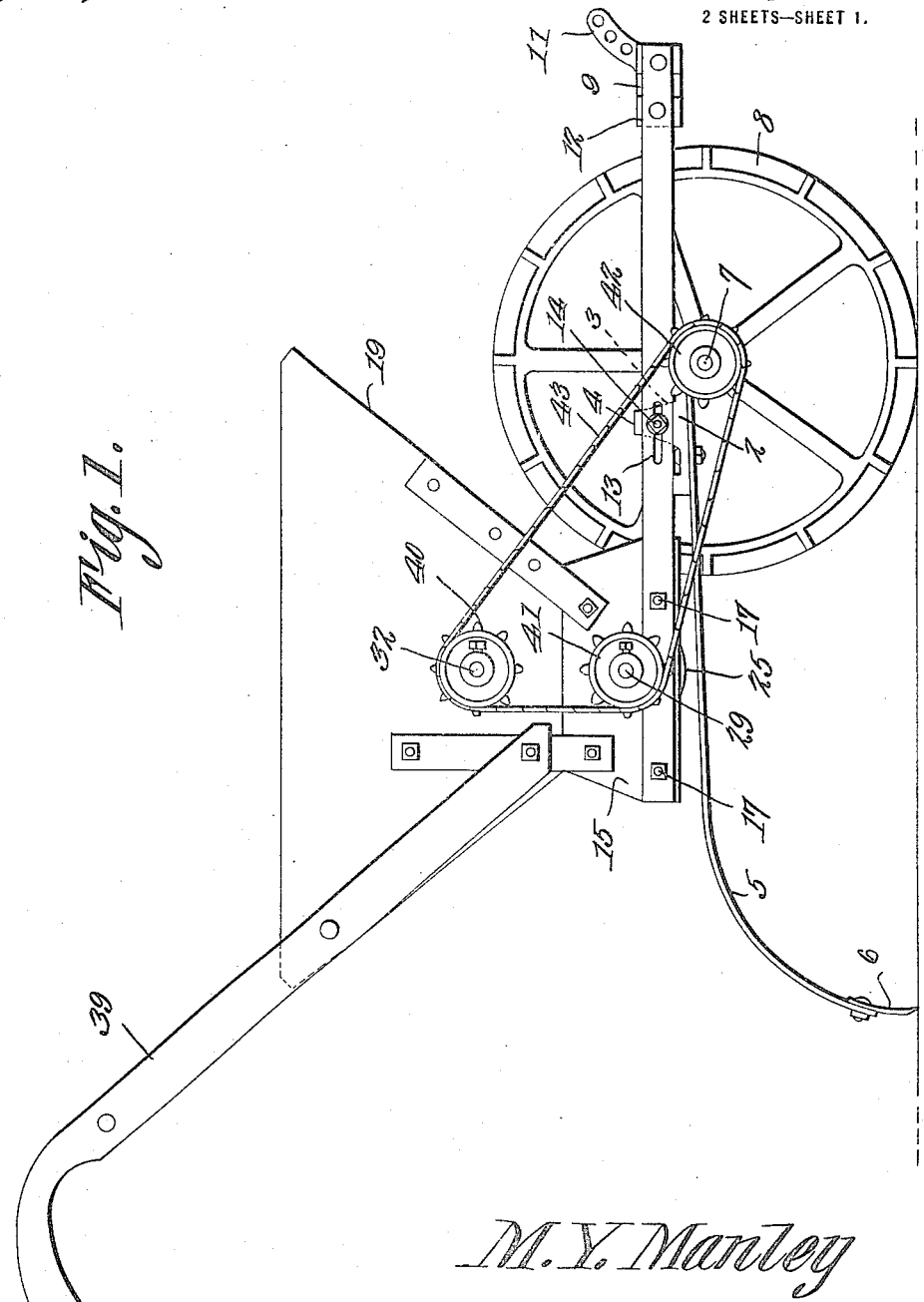

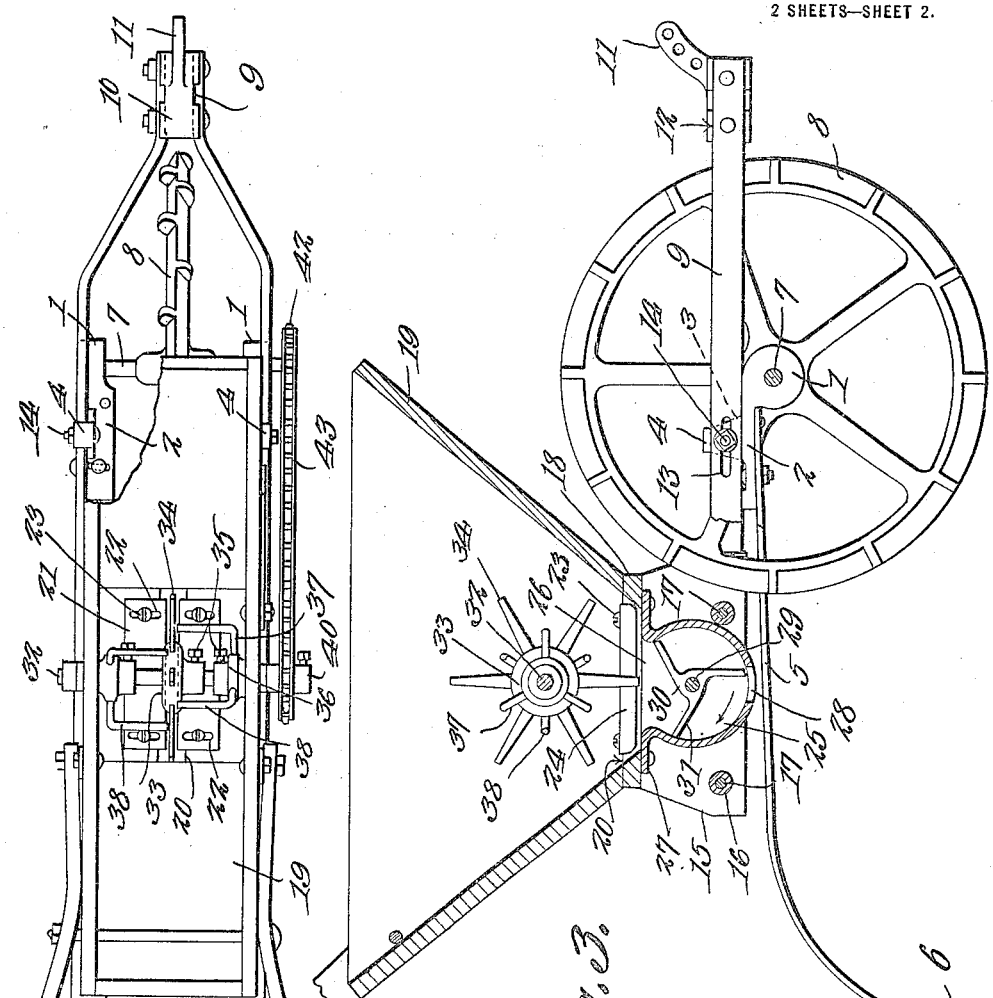

McCASLAN Y. MANLEY, OF NEWNAN, GEORGIA.

COTTON-SEED PLANTER.

1,222,228.

Specification of Letters Patent.

Patented Apr. 10, 1917.

Application filed July 18, 1916. Serial No. 109,954.

*To all whom it may concern:*

Be it known that I, McCASLAN Y. MANLEY, a citizen of the United States, residing at Newnan, in the county of Coweta and State of Georgia, have invented a new and useful Cotton-Seed Planter, of which the following is a specification.

This invention relates to cotton seed planters, one of its objects being to provide a planter which is light and durable in construction and which has novel means for agitating the contents of the hopper so that the outlet opening therein will not become clogged and the seeds will be properly supplied to dropping mechanism provided therefor.

Another object is to provide improved means for accurately dropping the seeds in predetermined quantities and at desired intervals apart.

Another object is to provide means whereby the discharge of seeds from the hopper to the dropping mechanism may be controlled.

A further object is to provide dropping mechanism which will control the discharge of seeds from the machine so that waste is reduced to the minimum.

A still further object is to provide novel means whereby the covering blades are adjustably connected to the frame of the planter.

With the foregoing and other objects in view which will appear as the description proceeds, the invention resides in the combination and arrangement of parts and in the details of construction, hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of a cotton seed planter embodying the present improvements.

Fig. 2 is a plan view thereof, a portion of the hopper and handles being broken away.

Fig. 3 is a vertical longitudinal section through the machine.

Referring to the figures by characters of reference 1 designates bearing members each having a rearwardly extending tongue 2 from the inner side of which projects an upwardly extending wing 3 provided at the top with an ear 4. Secured to the bottom of each tongue 2 is the front end portion of a spring strip 5 the lower end portion of which is curved downwardly and provided with a covering blade 6. An axle 7 is mounted for rotation in the bearings 1 and has secured to it a supporting wheel 8.

Resting on the bearing members 1 are forwardly converging side strips 9 between the front ends of which is clamped a block 10 from which projects a clevis 11. This block has longitudinal grooves 12 in its side faces in which the side strips 9 are seated. Longitudinal slots 13 are formed in the side strips 9 above the tongues 2 and extending into these slots are bolts 14 which project from the wings 3 and serve to bind the wings against the side strips and thus hold said strips against longitudinal movement relative to the tongues 2. By loosening the bolts 14, the side strips 9 can be adjusted forwardly or rearwardly as desired relative to the axle 7.

Arranged between and secured to the rear end portions of the side strips 9 are side boards 15 spaced apart at their lower edges by sleeves 16 which are mounted on elongated bolts 17 extending transversely through the side boards and through the side strips.

The side boards 15 extend downwardly from the sides of the bottom 18 of a hopper 19. Formed in the bottom 18 is a longitudinal opening 20 and secured upon said bottom 18 at opposite sides of this opening are regulating plates 21 each of which has transverse slots 22 adapted to receive fastening screws 23 or the like. Each regulating plate is provided with a depending flange 24 which projects into the opening 20. The seeds discharged from the hopper are adapted to pass between the two flanges and obviously by adjusting the plates 21 toward or from each other, the width of this outlet opening can be varied as desired.

Secured to the bottom 18 and between the side boards 15 is a segmental housing 25 having an open top 26 designed to receive seeds from the opening 20. Oppositely extending flanges 27 are extended from the top of this housing and are bolted or otherwise secured to the bottom 18. An outlet opening 28 is provided in the bottom of the housing.

Extending transversely through the side boards 15 and concentric with the housing 25 is a shaft 29 and secured on this shaft and within the housing is a revoluble dropper comprising a hub 30 and outstanding blades 31. The advancing faces of these blades are preferably tangent to the shaft 29 so that when said face of each blade is brought in line with the front wall of the opening 28, said face will be substantially vertical.

Extending transversely through the hopper 19 and preferably substantially in vertical alinement with the shaft 29 is a shaft 32 to the central portion of which is secured a hub 33 having fingers 34 radiating therefrom and designed to work successively into the outlet opening between the flanges 24. The hub 33 is adjustably mounted on the shaft and is held against movement relative thereto by a set screw 35 or the like.

Adjustably mounted on the shaft 32 are sleeves 36 which are arranged close to the inner faces of the sides of the hopper 19 and radiating from each of these sleeves are arms 37 from the outer ends of which extend fingers 38 which project toward the center of the hopper and work close to the bottom 18. Handles 39 are secured to the hopper and are extended upwardly and rearwardly therefrom.

Secured to one end portion of the shaft 32 is a sprocket 40 and another sprocket 41 is secured to one end of the shaft 29. A third sprocket 42 is secured to one end of the axle 7 and mounted on all of these sprockets is an endless chain 43. The sprockets 40 and 41 can be detached from their shafts and others substituted therefor so that it is thus possible to vary the speeds of rotation of the two shafts 29 and 32.

As has heretofore been pointed out, by providing the slots 13 and by mounting the side strips 9 in the peculiar manner pointed out, the hopper can be adjusted forwardly or rearwardly relative to the blades or shovels 6. When the machine is moved forward, motion will be transmitted through chain 43 to the two shafts 29 and 32. The members secured to the shaft 32 will thoroughly agitate the contents of the hopper and prevent the seeds from clogging the opening in the bottom 18. Furthermore the radial fingers 34 will thrust seeds downwardly through said opening so that they will fall into the opening 26 and thence into one of the pockets provided between the blades 31. During the agitation of the seeds, blades 31 will rotate in the housing 25, as indicated by the arrow in Fig. 3, and the seeds in each pocket formed in the housing will be brought to position above the opening 28 from which they will gravitate to the ground. As each of the blades 31 is brought to a substantially vertical position when at the front end of the opening 28, all of the seeds in each pocket are allowed to gravitate from the housing and there is little if any danger of any of the seeds becoming hung upon the dropping mechanism.

What is claimed is:—

1. In a cotton seed planter and the like, the combination with a hopper, a wheel supported frame, and side boards connecting the hopper to the frame, said hopper having an outlet opening in the bottom thereof, of a segmental housing between the side boards and in communication with said outlet opening, said housing having an opening in the bottom thereof, a shaft extending through the housing and side boards and concentric with the housing, blades revoluble with the shaft and dividing the interior of the housing into separate pockets, each blade being tangent to the shaft, agitating means within the hopper, and means operated by the forward movement of the frame for rotating the agitating means and blades simultaneously.

2. The combination with a wheel supported frame, of a hopper, side boards connecting the hopper to the frame, said hopper having an opening in the bottom thereof, means extending into the opening for varying the width of the opening, a segmental housing interposed between the side boards for receiving material from said opening, said housing having a discharge opening in the bottom thereof, a shaft extending transversely through the housing and concentric therewith, blades revoluble with the shaft and dividing the housing into separate pockets, each blade being tangent to the shaft, a shaft extending transversely through the hopper, agitating means thereon, certain of said means being movable into the outlet opening of the hopper, and means operated by the supporting wheel for simultaneously rotating the blades and agitating means.

In testimony that I claim the foregoing as my own, I have hereto affixed my signature in the presence of two witnesses.

McCASLAN Y. MANLEY.

Witnesses:
C. D. MANLEY,
J. W. RADNEY.